(12) United States Patent
Kolodziej

(10) Patent No.: US 10,336,554 B1
(45) Date of Patent: Jul. 2, 2019

(54) DEVICE FOR SEPARATING AND ALIGNING PIN-SHAPED PIECE GOODS

(71) Applicant: Ricon GmbH & Co. KG, Rieste (DE)

(72) Inventor: Jan-Christopher Kolodziej, Melle (DE)

(73) Assignee: Ricon GmbH & Co. KG (DE)

( * ) Notice: Subject to any disclaimer, the term of this patent is extended or adjusted under 35 U.S.C. 154(b) by 0 days.

(21) Appl. No.: 16/223,649

(22) Filed: Dec. 18, 2018

(30) Foreign Application Priority Data

Dec. 19, 2017 (DE) .......................... 10 2017 130 500

(51) Int. Cl.
| | | |
|---|---|---|
| *B65G 47/04* | (2006.01) | |
| *B65G 47/30* | (2006.01) | |
| *B65G 47/24* | (2006.01) | |
| *B65G 11/02* | (2006.01) | |

(52) U.S. Cl.
CPC ............ *B65G 47/24* (2013.01); *B65G 11/023* (2013.01); *B65G 47/30* (2013.01)

(58) Field of Classification Search
CPC ....... B65G 47/24; B65G 47/30; B65G 11/023
USPC ... 198/377.01, 540, 544, 547, 550.4, 803.14
See application file for complete search history.

(56) References Cited

U.S. PATENT DOCUMENTS

| | | | | |
|---|---|---|---|---|
| 4,265,072 A | * | 5/1981 | Egli | .......................... B65B 57/20 |
| | | | | 193/46 |
| 5,376,771 A | * | 12/1994 | Roy | .......................... B41M 5/24 |
| | | | | 219/121.71 |
| 5,762,712 A | * | 6/1998 | Sohn | ................. A61F 13/15658 |
| | | | | 118/419 |
| 6,185,901 B1 | * | 2/2001 | Aylward | ................. B65B 5/103 |
| | | | | 266/131 |
| 6,622,849 B1 | * | 9/2003 | Sperling | .............. B65D 90/623 |
| | | | | 198/532 |
| 7,228,955 B2 | * | 6/2007 | Comas Corral | ... B65G 47/1478 |
| | | | | 198/526 |
| 7,795,556 B1 | * | 9/2010 | Dean | ..................... B07C 5/3422 |
| | | | | 198/698 |

(Continued)

*Primary Examiner* — Douglas A Hess
(74) *Attorney, Agent, or Firm* — Husch Blackwell LLP

(57) ABSTRACT

A device for separating and aligning pin-shaped piece goods exhibiting a head and a shank includes a funnel-shaped receptacle for receiving the piece goods. The receptacle has two wall sections which delimit the receptacle in a front area, and a rear wall, which are arranged in sections opposite one another and in each case inclined outwards at an angle to the central transversal plane of the receptacle. An endlessly circulating conveying means is arranged underneath a recess which spaces apart the two wall sections and which is arranged at a same angle ($\alpha$) as the wall sections inclined relative to the central transversal plane and conveys the piece goods from a receiving plane to a higher discharge plane. The conveying means has a conveying plane provided with drivers. The recess is delimited by parallel front edges of the wall sections which are arranged in a V-shape tapering towards the conveying means and terminate above the conveying means or in a plane with the conveying means. The drivers are in the form of cylindrical pins which are arranged at a distance from one another in the direction of circulation of the conveying means and extend essentially perpendicular to the conveying plane of the conveying means.

15 Claims, 4 Drawing Sheets

(56) References Cited

U.S. PATENT DOCUMENTS

| | | | | |
|---|---|---|---|---|
| 8,037,992 | B2* | 10/2011 | Ackley, Jr. | B65G 47/24 |
| | | | | 198/383 |
| 8,616,364 | B2* | 12/2013 | Priepke | A01D 41/1217 |
| | | | | 198/716 |
| 9,096,390 | B2* | 8/2015 | Ackley | B07C 5/00 |
| 10,124,968 | B2* | 11/2018 | Zotti | B65G 19/14 |
| 2002/0104741 | A1* | 8/2002 | Buckley et al. | |
| 2004/0094389 | A1* | 5/2004 | Boyce | |

* cited by examiner

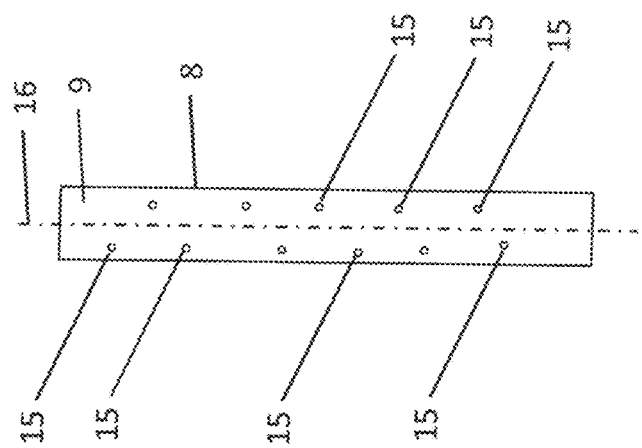
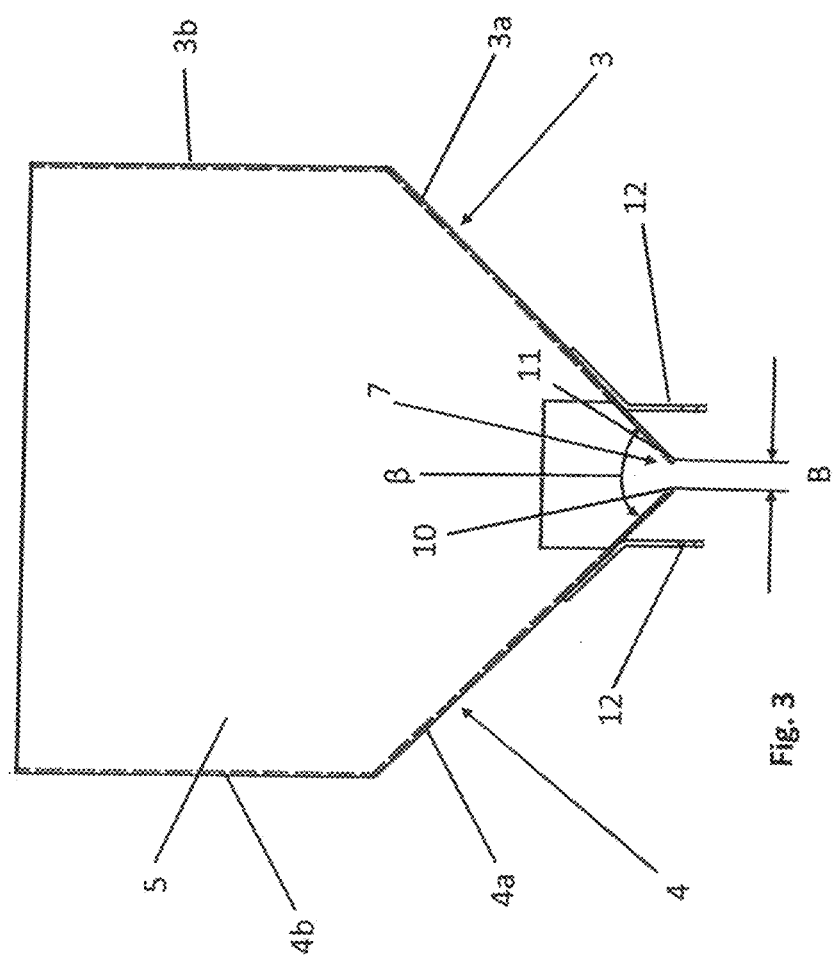
Fig. 3
Fig. 4

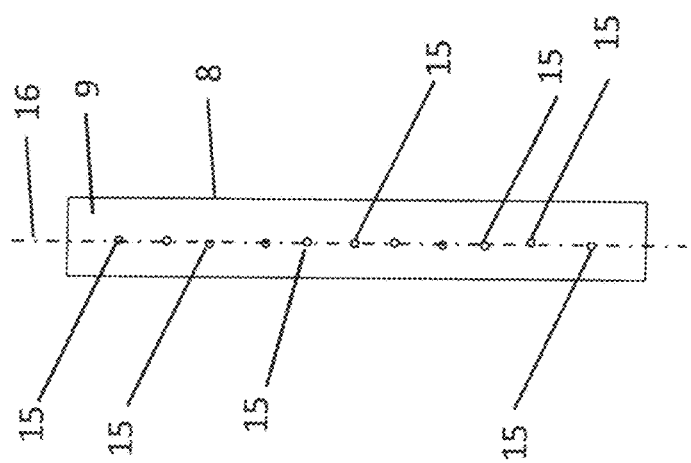

DEVICE FOR SEPARATING AND ALIGNING PIN-SHAPED PIECE GOODS

CROSS REFERENCE

This application claims priority to German Application No. 10 2017 130500.9, filed 19 Dec. 2017, the entirety of which is hereby incorporated by reference.

FIELD OF THE INVENTION

The present invention concerns a device for separating and aligning pin-shaped piece goods exhibiting a head and a shank, in particular rivets.

BACKGROUND OF THE INVENTION

A similar device, known from WO 2007/068129 A1, comprises a funnel-shaped receptacle for receiving piece goods, with a front wall and a rear wall, which are arranged opposite each other and each inclined outwards at an angle to the vertical, as well as at least two side walls extending between the front wall and the rear wall. Within a recess in the front wall a driven conveyor belt is arranged which is inclined to the vertical at the same angle as the front wall and which conveys the piece goods, performs of plastic lugs or screws, from a receiving plane in the receptacle to a higher discharge plane. The piece goods are to be removed individually from the receptacle by means of the conveyor belt, which is divided into individual sections by drivers extending across the width of the conveyor belt. This can be demonstrated with the performs of plastic lugs, as these are easy to separate due to their size and shape. Pin-shaped piece goods exhibiting a head and a shank, such as screws, are generally considerably smaller in their dimensions and tend, due to their contour, to get hooked into one another, which makes separation by the conveyor belt at least far more difficult, as the sections between the drivers generally receive and discharge more than one screw.

SUMMARY OF THE INVENTION

It is the task of the present invention to further develop a device for separating and aligning pin-shaped piece goods exhibiting a head and a shank in such a way that it is characterized by a simplified and more cost-effective construction.

A device is proposed for separating and aligning pin-shaped piece goods exhibiting a head and a shank, in particular rivets. The device comprises an essentially funnel-shaped receptacle for receiving the piece goods, having two wall sections which delimit the receptacle in its front area and a rear wall, wherein the wall sections and the rear wall are arranged opposite one another in sections and are each inclined outwards at an angle to the central transversal plane of the receptacle. The receptacle exhibits an endlessly circulating conveying means arranged underneath a, in particular slot-shaped, recess which spaces apart the wall sections and which conveys piece goods from a receiving plane to a higher discharge plane. The endlessly circulating conveying means has a conveying level provided with drivers. For separating and aligning the pin-shaped piece goods exhibiting a head and a shank, it is intended that the slot-shaped recess is delimited by parallel front edges of the wall sections tapering towards the conveying means in a V-shape, and that the front edges terminate above the conveying means or in a plane with the conveying means, and that the drivers in the form of cylindrical pins are spaced apart and arranged in the direction of circulation of the conveying means and essentially extend perpendicular to the conveying plane of the conveying means. The wall sections exhibit a first inclination with respect to the central transversal plane, so that a first angle is enclosed between the rear wall and the wall sections. With respect to a longitudinal axis of the recess, the wall sections exhibit a second inclination, so that additionally a second angle smaller than 90° is included between the opposite wall sections that are spaced apart by the recess. The conveying means grips the piece goods lying at the top of the receptacle, in particular rivets, which protrude at least in sections onto the conveying means. The drivers grip the piece goods and convey them away. During this process, the additional inclination of the wall sections under the second angle causes the piece goods to orient themselves in longitudinal direction. In addition, there is the effect that piece goods which are only dragged along by the conveying means or its drivers, i.e. which have no direct contact with the drivers of the conveying means, are detached from the latter and slip back into the receptacle. Preferably, the separated piece goods can be transferred immediately to a downstream device for storage after they have passed the discharge plane.

At the same time, the width of the slot-shaped recess between the wall sections should at least correspond to the width of the drivers and at most to the length of the piece goods. This avoids wedging of the piece goods between the front edges of the wall sections and the conveying means. It is particularly advantageous if the width of the recess essentially corresponds to the width of the drivers, which is smaller than the head diameter of the piece goods. In this way it is possible to ensure that the head of the piece goods can be gripped by the driver, whereas the head itself does not rest on the conveying means but on the wall sections which limit the recess.

According to a preferred enhanced design, the drivers can exhibit a circular cylindrical or polygonal cross-section. The drivers on the conveying means provide for a permanent movement of the piece goods in the receptacle as they pass through the recess in the hopper. In this way, the effect of an arch or tunnel forming in the area of the recess above the conveying means during the continuous removal of the piece goods can be avoided, as individual piece goods slip in the direction of the recess.

It is advantageous if the drivers are alternately offset in the direction of circulation of the conveying means to the longitudinal axis of the conveying means between its peripheral area and the longitudinal axis. This prevents the formation of interconnected chains of piece goods which are conveyed away by the endlessly circulating conveying means.

In particular, piece goods conveyed by the conveying means to the discharge plane can be transferred to a downstream chute inclined at an angle to the horizontal. For this purpose the chute may have at least one channel or two adjacent channels with an essentially U-shaped profile, the cross-section of the respective channel being wider than the head and narrower than the length of the shank. The number of channels of the chute can be chosen depending on the design of the conveying means. In particular, this may depend on the position of the drivers on the conveying means.

Preferably, the inclination of the conveying means can be greater than or equal to 30° and less than or equal to 60°. In accordance with the inclination of the conveying medium and the resulting change in the second angle at which the wall sections are inclined to each other, the order of magnitude of the throughput of conveyed piece 5 goods from the receptacle can be varied. In particular, the inclination of the conveying means can be adjusted as a function of the geometry of the piece goods.

Furthermore, the recess can essentially extend from the lowest point of the receptacle to the upper edge of the wall sections. The conveying plane of the conveying means, which is provided with the essentially pin-shaped drivers, thus ensures that the bulk cone of piece goods, which tapers to the lowest point of the receptacle, is always thoroughly mixed and loosened in order to avoid arching, i.e. the sectional formation of cavities or tunnels in the bulk cone, the formation of which prevents piece goods from being entrained by the conveying means. In addition, this arrangement allows the receptacle to be emptied completely or virtually completely.

According to a preferred enhanced design, the distance between two channels in the longitudinal direction of the chute can widen from the receiving area to the discharge area. This allows an adaptation to a conveying width of devices arranged downstream of the chute to be achieved.

Furthermore, in order to improve the sliding properties of at least one of the channels, a coating minimising static friction can be applied so that the piece goods can largely pass without problems through at least one channel.

In accordance with a preferred design, it may be provided that a sensor array is arranged in the discharge plane or at the height of the discharge plane or downstream of the discharge plane, which is set up for the detection of geometric properties of the piece goods. By means of the sensor array, the separated piece goods can be monitored with regard to compliance with pre-definable geometric dimensions. The sensor array is designed for the optical detection of the geometric dimensions of the piece goods, in particular of rivets.

In particular, it is possible for the conveying means to be driven electromechanically by an actuator. The actuator can be designed as an electric motor which is connected to the drive of a deflection pulley of the conveying means. The electric motor can be integrated into the deflection pulley. At the same time, the deflection pulley can be designed as a rotor of the electric motor. Preferably, the electric motor can be designed as a stepper motor. This allows for a precise control, as the respective position is known when starting and stopping the stepper motor. This makes it possible to sort out piece goods which have been identified by the sensor array due to differing geometric dimensions. Preferably, the rejection can take place automatically.

Alternatively, the conveying means can be driven mechanically or pneumatically. In particular, the pneumatic drive of the conveying means is advantageous as it can be operated largely without wear. This is of advantage against the background of repeated starting and stopping of the conveying means in order to be able to reject piece goods which do not correspond to specified geometric dimensions.

Another advantage is that the conveying speed of the endlessly circulating conveying medium can be adjusted. This allows a need-based adaptation to the piece goods to be conveyed as well as a throughput to be set.

Furthermore, a conveyor device can be arranged downstream of the chute, and transports the piece goods coming from the chute away at a conveying speed dependent on the drive speed of the conveying means arranged in the receptacle.

The endlessly circulating conveying means can preferably be designed as a conveyor belt or a link chain. At the same time, the upper run of the conveyor belt forms the conveying plane.

For this the conveyor device can be connected to the drive of the conveying means. The conveyor device can be designed as a further conveyor belt endlessly circulating around deflection pulleys with a conveying surface. For driving, one of the deflection pulleys of the conveyor belt arranged in the receptacle can be connected to one of the deflection pulleys of the conveyor device by means of a belt drive.

It is advantageous that at least one separation element can be provided for dividing a conveying surface of the conveyor device into two parallel conveying sections which are spaced apart and are adapted to the spacing between two channels in the discharge area.

BRIEF DESCRIPTION OF THE DRAWINGS

Reference is now made more particularly to the drawings, which illustrate the best presently known mode of carrying out the invention and wherein similar reference characters indicate the same parts throughout the views.

FIG. 3 is a view from above into the receptacle according to FIG. 2.

FIG. 4 is a view of a schematically depicted conveying surface of a conveyor belt of the separating device.

FIG. 5 is an alternative design of a conveying means executed as a conveyor belt.

DETAILED DESCRIPTION OF THE DRAWINGS

Figure 1:
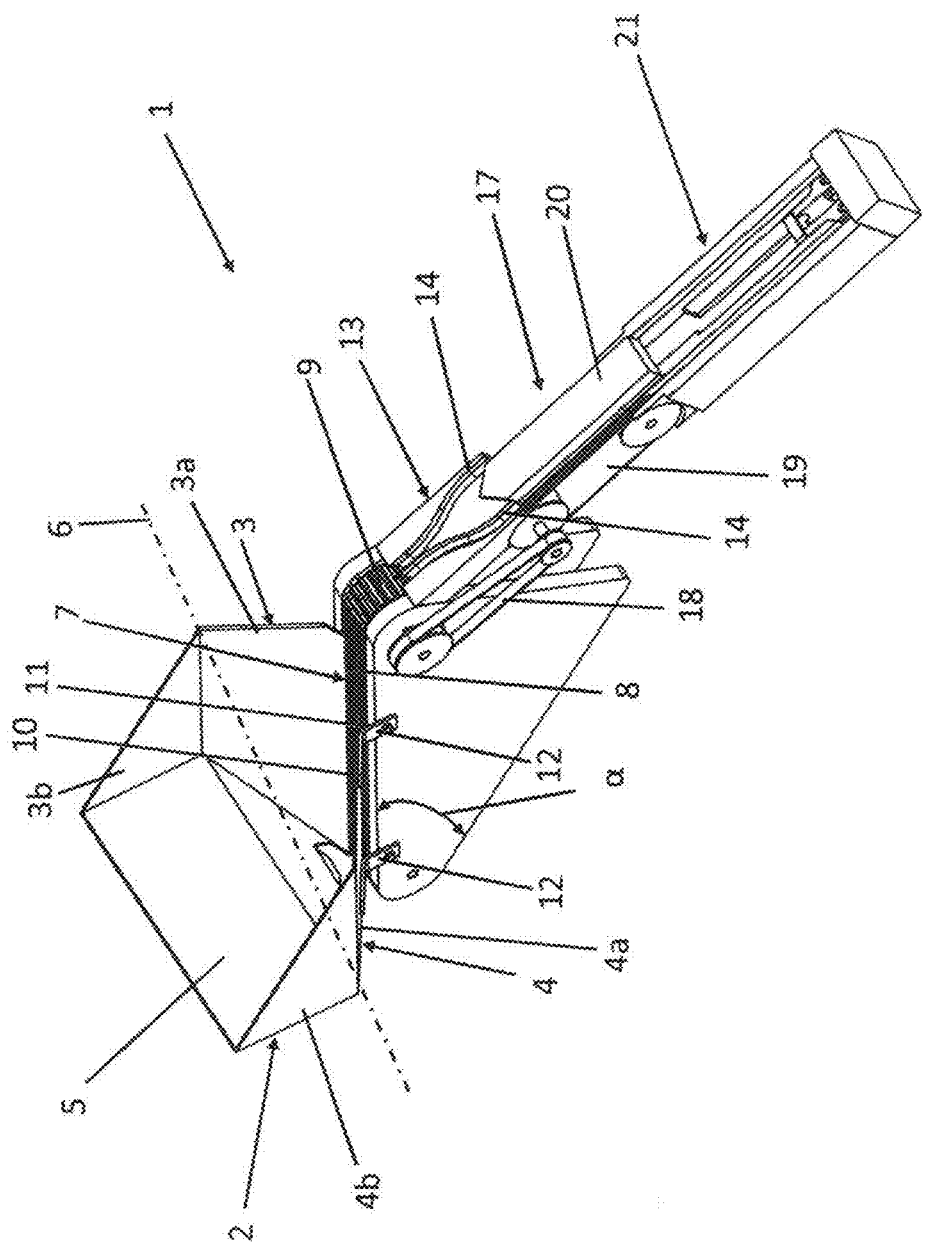
FIG. 1 is a perspective view of a separating device.

FIG. 1 shows a perspective view of a separating device 1 for separating and aligning pin-shaped piece goods exhibiting a head and a shank, in particular rivets. Device 1 comprises an essentially funnel-shaped receptacle 2 for receiving the piece goods in the form of rivets. The receptacle 2 has two wall sections 3, 4, which delimit the receptacle 2 in a front area and laterally in sections, as well as a rear wall 5, which delimits the receptacle 2 in a rear area. The rear wall 5 extending between the wall sections 3, 4 spaces apart the two wall sections 3, 4 in the rear area. The wall sections 3, 4 and the rear wall 5 are opposite each other in sections and are each inclined outwards at an angle to an imaginary central transversal plane 6 of the receptacle 2, resulting in the essentially funnel-shaped design of the receptacle 2.

The two wall sections 3 and 4 are spaced apart in the front area by a continuous, in particular slot-shaped, recess 7, which extends from the lowest point of the receptacle 2 to the upper edge of the wall sections 3, 4. The two wall sections 3, 4 each have a front segment 3a, 4a and a rear segment 3b, 4b. The front segments 3a, 4a extend in sections from the recess 7 towards the rear wall 5. The front segments 3a, 4a are joined by the rear segments 3b, 4b, which are inclined at an angle to the front segments 3a, 4a. The rear segments 3b, 4b extend to the rear wall 5 and are arranged at an angle of about 90° to the rear wall 5. The front segments 3a, 4a have an inclination $\beta$ with respect to a longitudinal axis of the recess 7, as can be seen from the illustration in FIG. 4.

Parallel to the recess 7, there is an endlessly circulating conveying means below the wall sections 3 and 4, in the form of a conveyor belt 8, which circulates around deflection pulleys which are arranged at a distance from one another and which are not shown in detail. The conveying means can also be designed as a link chain which revolves around corresponding pinions. The conveyor belt 8 is inclined to the centre transversal plane 6 at the same angle a as the wall sections 3, 4. The conveyor belt 8 conveys the piece goods from receptacle 2 from a receiving plane inside receptacle 2 to a higher discharge plane above receptacle 2. The receiving plane is variable as it is defined by the respective filling level of receptacle 2. The discharge plane forms the upper deflection point of conveyor belt 8. To carry the piece goods, conveyor belt 8 is equipped with drivers 13 on its conveying surface 9, which is formed as the upper run. The conveyor belt 8 has an inclination a which is greater than or equal to 30° and less than or equal to 60°. A sensor array 22 is positioned in the discharge plane or at the level of the discharge plane or downstream thereof; it serves the optical detection of geometric dimensions of the separated piece goods. The sensor array 22 is used to identify piece goods with dimensions deviating from a pre-definable geometric dimension, thus enabling, in particular automated, rejection of the identified piece goods.

The recess 7 is limited by parallel front edges 10, 11 of the wall sections 3, 4, which are arranged in a V-shape tapering towards the conveyor belt 8. The front edges 10 and 11 terminate above conveyor belt 8 or in one plane with conveying surface 9 of conveyor belt 8. Brackets 12 are provided for attachment to a frame 13 accommodating conveyor belt 8. The frame 13 accommodates an actuator for driving one of the deflection pulleys in order to drive the conveyor belt 8 in an endlessly circulating manner. The inclination of the front edges 10, 11, which limit the, in particular slots shaped, recess 7, corresponds to the inclination a of the conveyor belt 8. The deflection pulley can be driven electromechanically, for example by a stepper motor, mechanically or pneumatically. The drive of the deflection pulley is briefly interrupted for the rejection of piece goods which do not correspond to the specified geometric dimensions.

A chute 13 is connected to the discharge plane. The chute 13 has two channels 14, to which the piece goods, i.e. the rivets, are transferred from conveyor belt 8. The channels 14 have an essentially U-shaped profile. The cross-section of channels 14 is wider than the head and narrower than the length of the shank of the rivets to be separated. The distance between the channels 14 widens in the longitudinal direction of the chute from the receiving area to the discharge area. The channels 14 have a coating that minimizes static friction.

A conveyor device 17 is arranged downstream of chute 13, and transports the piece goods coming from chute 13 away at a conveying speed dependent on the drive speed of the conveyor belt 8 arranged in receptacle 2.

For this, the conveyor device 17 is connected to the drive of conveyor belt 8. The conveyor device 17 can be designed as a further conveyor belt 19 endlessly circulating around deflection pulleys with a conveying surface. For driving, one of the deflection pulleys of the conveyor belt 8 arranged in the receptacle 2 can be connected to one of the deflection pulleys of the conveyor device 17 by means of a belt drive 18.

At least one separation element 20 is to be provided for dividing a conveying surface of the conveyor device 17 into two parallel conveying sections which are spaced apart and are adapted to the spacing between the two channels 14 in the discharge area.

In the implementation example shown, an output device 21 is connected to the conveyor device 17, which enables individual removal of the rivets.

Figure 2:
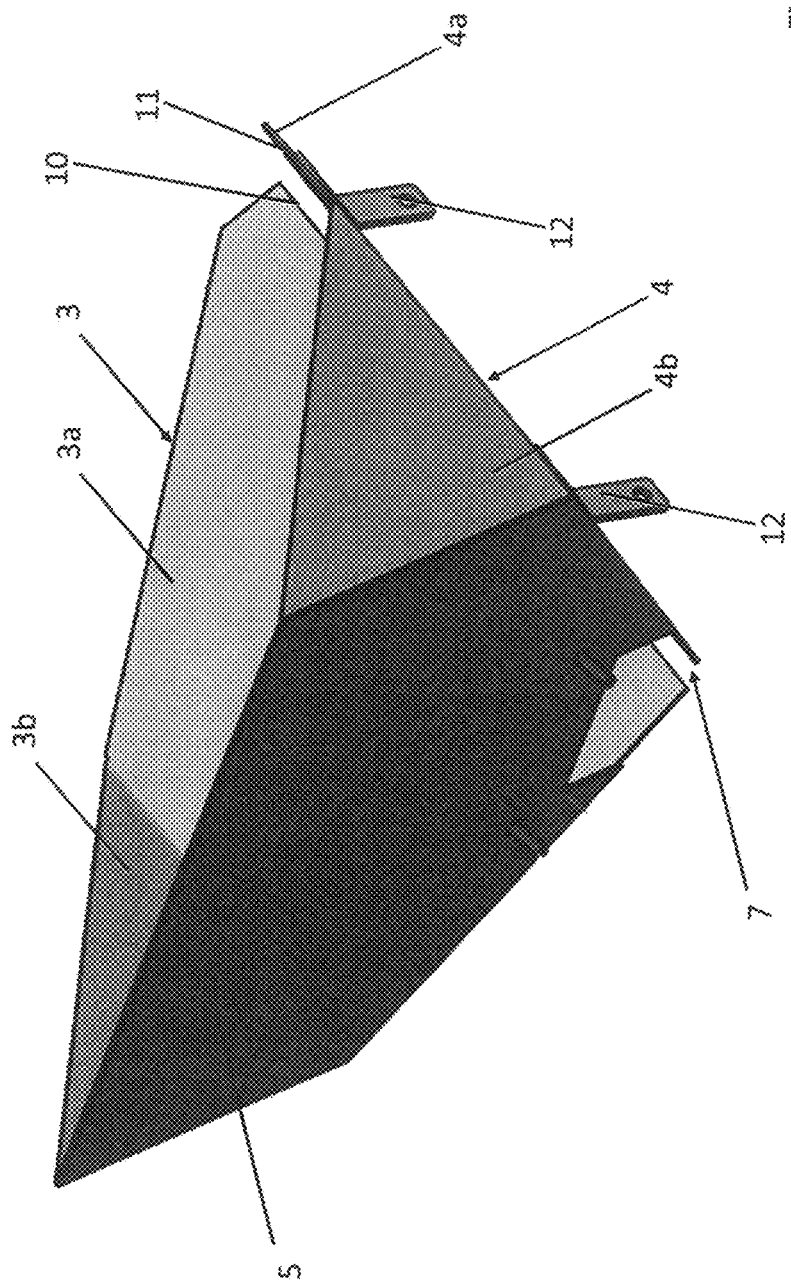
FIG. 2 is an isometric view of a receptacle of the separating device.

The illustration in FIG. 2 shows an isometric view of receptacle 2 of the separating device 1. FIG. 3 shows a view from above into receptacle 2. The recess 7 has a width B which corresponds at least to the width of the drivers 15 and at most to the length of the piece goods.

FIG. 4 illustrates a view of the schematically depicted conveying surface 9 of the conveyor belt 8 of the separating device 1. The drivers 15 are arranged on both sides of the longitudinal axis 16 of the conveyor belt 8 between a respective peripheral area and the longitudinal axis 16. In the longitudinal direction of the conveyor belt 8, the drivers 15 are arranged alternately offset to each other. The drivers 15 are designed as cylindrical pins which essentially extend perpendicular to the conveying surface 9 of the conveyor belt 8. At the same time, the drivers 15 can have a circular or polygonal cross-section.

FIG. 5 shows an alternative design of the conveying means executed as a conveyor belt 8. The conveyor belt 8a is narrower than the conveyor belt 8 illustrated in FIG. 4. In the longitudinal direction of the conveyor belt 8a, the drivers 15 are arranged one behind the other in alignment. This design of the conveying means restricts the entrainment of the pin-shaped piece goods to a single element in the area of the respective driver 15.

Depending on the design of the conveyor belt 8 or 8a according to FIG. 4 or 5, the chute 13 exhibits two or in the case of the conveyor belt 8a only one chute 14.

LIST OF REFERENCE SIGNS

1 Separating device
2 Receptacle
3 Wall section
3a Front segment
3b Rear segment
4a Front segment
4b Rear segment
5 Rear wall
6 Central transversal plane
7 Recess
8 Conveyor belt
9 Conveying surface
10 Front edge
11 Front edge
12 Bracket
13 Chute
14 Channel
15 Driver
16 Longitudinal axis of 8
17 Conveyor device
18 Belt drive
19 Conveyor belt
20 Separation element
21 Output device
22 Sensor array
α Inclination
β Inclination
B Width of 7

The invention claimed is:

1. A device for separating and aligning pin-shaped piece goods exhibiting a head and a shank, the device comprising:
 a generally funnel-shaped receptacle for receiving the piece goods, the generally funnel-shaped receptacle having:

a central transverse place, two wall sections which delimit the receptacle in a front area, and a rear wall, wherein the wall sections and the rear wall are arranged opposite one another and are inclined outwards at an angle to the central transversal plane of the receptacle;

an endlessly circulating conveying means which is arranged underneath a recess, wherein the recess spaces apart the two wall sections and is arranged at the same angle as the wall sections inclined relative to the central transversal plane, the endlessly circulating conveying means conveying the piece goods from a receiving plane to a higher discharge plane;

wherein the endlessly circulating conveying means has a conveying plane provided with drivers;

wherein the recess is delimited by parallel front edges of the wall sections which are arranged in a V-shape tapering towards the conveying means and terminate in at least one of: above the conveying means and in a plane with the conveying means;

wherein the drivers are in the form of cylindrical pins which are arranged at a distance from one another in the direction of circulation of the conveying means and extend generally perpendicular to the conveying plane of the conveying means.

2. The device according to claim 1, wherein the recess between the wall sections has a width (B) which corresponds at least to the width of the drivers and at most to the length of the piece goods.

3. The device according to claim 1, wherein the drivers have a circular or polygonal cross-section.

4. The device according to claim 1, wherein the drivers are arranged alternately offset with respect to a longitudinal axis of the conveying means in the direction of circulation of the conveying means between its peripheral area and the longitudinal axis.

5. The device according to claim 1, wherein piece goods conveyed by the conveying means onto the discharge plane are transferred to a downstream chute which is arranged inclined at an angle to the horizontal and has at least one channel with a generally U-shaped profile, wherein the cross-section of the channel is wider than the head and narrower than the length of the shank.

6. The device according to claim 5, wherein at least one channel has a coating which minimizes static friction.

7. The device according to claim 5, wherein a conveyor device is arranged downstream of the chute, and transports away the piece goods coming from the chute at a conveying speed dependent on the drive speed of the conveying means arranged in the receptacle.

8. The device according to claim 7, wherein the conveying device is connected to the drive of the conveying means.

9. The device according to claim 7, wherein at least one separation element is provided for dividing a conveying surface of the conveyor device into two parallel conveying sections which are spaced apart and are adapted to the spacing existing between the two channels in the discharge area.

10. The device according to claim 1, wherein the inclination of the conveying means is greater than or equal to 30° and less than or equal to 60°.

11. The device according to claim 1, wherein the recess extends essentially from the lowest point of the receptacle to the upper edge of the wall sections.

12. The device according to claim 1, wherein a sensor array is arranged in the discharge plane or at the height of the discharge plane or downstream of the discharge plane, which is set up for the detection of geometric properties of the piece goods.

13. The device according to claim 1, wherein the conveying means is driven electromechanically by an actuator.

14. The device according to claim 1, wherein the conveying means is driven mechanically or pneumatically.

15. The device according to claim 1, wherein the conveying means is at least one of a conveyor belt and a link chain.

* * * * *